United States Patent [19]
Melcher
[11] 3,805,182
[45] Apr. 16, 1974

[54] DEVICE FOR CONTROLLING THE FREQUENCY AND PHASE OF AN OSCILLATOR

[76] Inventor: Domenic Melcher, Bonstellenstr 56, Uster, Switzerland

[22] Filed: Aug. 22, 1972
[21] Appl. No.: 282,868

[30] Foreign Application Priority Data
May 24, 1972 Switzerland ........................ 7685/72

[52] U.S. Cl. ...................... 331/16, 331/1 A, 331/17, 331/108 R
[51] Int. Cl. ............................................ H03b 3/04
[58] Field of Search ......................... 331/1 A, 16, 17

*Primary Examiner*—John Kominski
*Attorney, Agent, or Firm*—Stevens, Davis, Miller & Mosher

[57] ABSTRACT

The present invention relates to a device for controlling the frequency and phase of an oscillator, preferably within a wide range of frequencies. Such devices serve, for instance, to divide a control frequency by a given factor and to hold this submultiple frequency after as short as possible a regulating time within a given phase relationship with the control frequency. It is the object of the present invention to synchronize the frequency of a local oscillator in phase with the frequency of a master oscillator in such a way that the response to control is quick and effective throughout a wide range of frequencies, i.e., over many octaves, and the frequency of the local oscillator is preferably a submultiple of the frequency of the master oscillator. The arrangement proposed by the invention is characterised in that the control circuit comprises an outer and an inner loop, the outer loop containing a phase discriminator, a difference integrator, a voltage-controlled oscillating circuit and a frequency divider, whereas the inner loop comprises only the difference integrator, the voltage-controlled oscillating circuit and the frequency divider and these loops functionally cooperate in that the phase discriminator uses the original control signal $U_s$ of frequency $F_s$ and the divided frequency signal $U_t$ of frequency $F_t$ of the voltage-controlled oscillating circuit to form a signal $U_e$ containing the information relating to the phase difference between the two signals, whereas the difference integrator uses the RC-averaged signal $U_e$ and the likewise RC-averaged signal $U_t$ from the inner loop to form the true integral of their difference, which in the form of a signal $U_r$ feeds the voltage-dependent oscillating circuit which provides the signal $U_o$ of the frequency $F_o$ which simultaneously feeds the user and the frequency divider which applies the signal $U_o$ after division by the factor *n* as a signal $U_t$ of the frequency $F_t$ to both the phase discriminator in the outer loop and the difference integrator in the inner loop.

3 Claims, 4 Drawing Figures

DEVICE FOR CONTROLLING THE FREQUENCY AND PHASE OF AN OSCILLATOR

Figure 1:
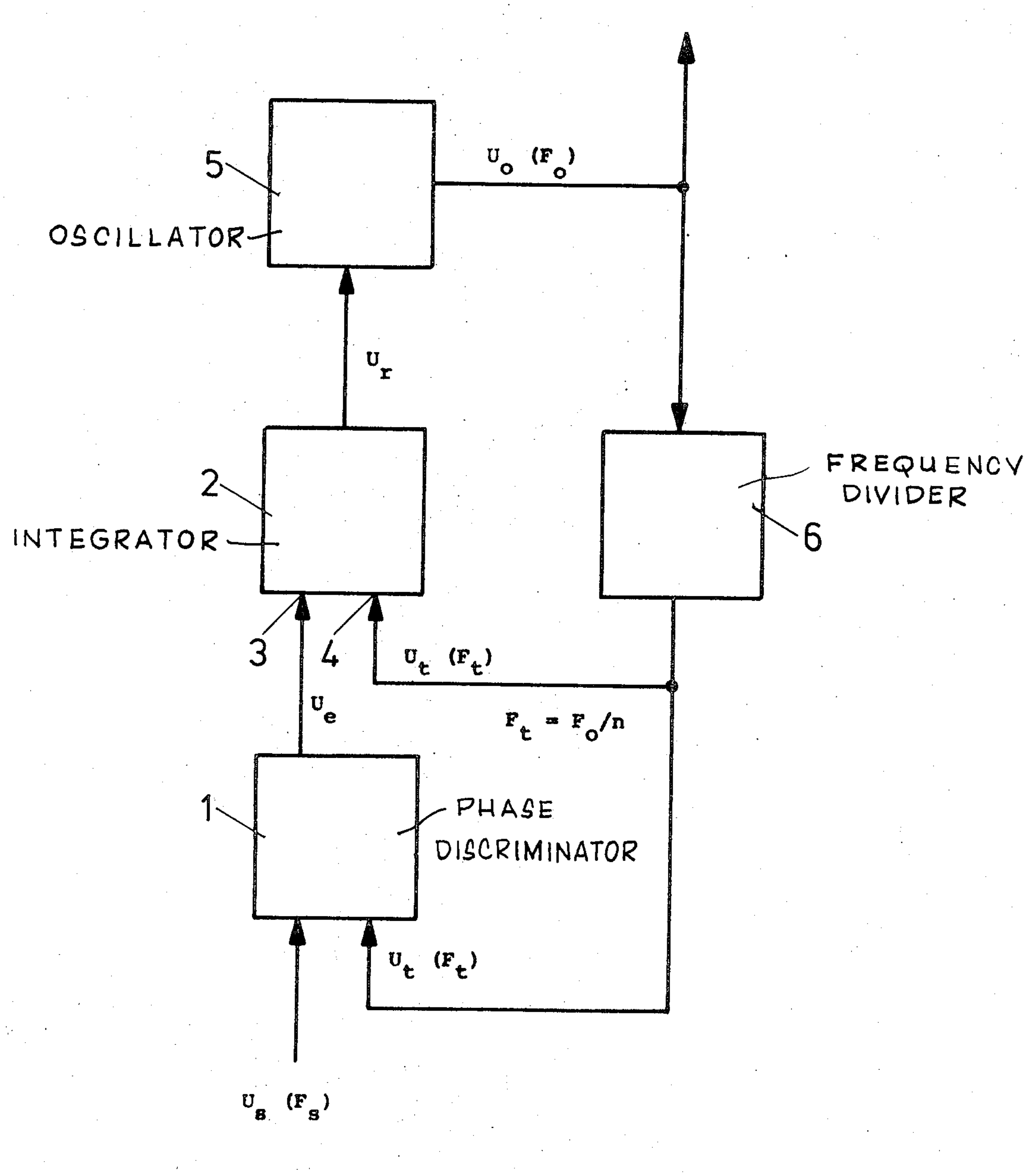

The present invention relates to a device for controlling the frequency and phase of an oscillator, preferably within a wide range of frequencies. Such devices serve, for instance, to divide a control frequency by a given factor and to hold this submultiple frequency after as short as possible a regulating time within a given phase relationship with the control frequency. Circuit arrangements for controlling an oscillating circuit to maintain a constant frequency $F_s$ are known in the art. In principle they usually consist of a closed loop comprising the following components : an oscillating circuit, a phase discriminator, a filter and, if the control frequency is to be divided, a frequency divider. The oscillating circuit, also referred to as the local oscillator, which is to be controlled with respect to its frequency and phase, provides an output signal $U_o$ for further use. This output signal is also applied to the phase discriminator which receives the control signal $U_s$ as a second input, the control signal being obtained from a master oscillator which is outside the control circuit. If it is intended to feed not the frequency of a master oscillator but a submultiple thereof to the user, then a frequency divider is interposed between the local oscillator and the phase discriminator for the purpose of stepping down the oscillator frequency by the desired factor. In the phase discriminator an error signal $U_e$ is formed from the phase difference between the two signals $U_s$ and $U_o$ as the major determining values. This error signal is taken to a filter designed as a high or low pass or as a band pass filter, according to the intended application of the control circuit.

As a function of the transmission characteristic of the filter the latter generates a control signal $U_r$ for application to the local oscillator which has the form of a voltage-controlled oscillating circuit, the control signal changing the frequency of the oscillating circuit until the signal $U_e$ from the phase discriminator attains a value indicating that synchronism between the master and the local oscillators has been achieved or, in the event of the voltage-controlled oscillating circuit being intended to work at a submultiple of the frequency $F_s$, that the reducing factor $n$ has been established exactly.

Due either to the construction of either the phase discriminator, the filter or the voltage-controlled oscillating circuit or to any two or all three of these components, the frequency range within which this control operates — i.e., the so-called synchronization range of the circuit — is relatively narrow. However, in many cases this is not a disadvantage if the fluctuations of the control frequency $F_s$ are only small. However, if the frequency range either of the master oscillator or of the voltage-controlled oscillating circuit varies within wide limits, then the above-described technical means are generally insufficient to keep the local oscillators in step with the frequency of the master oscillator. Means are known in the art which permit the synchronization range to be artificially widened. These consist either in that, whenever the two oscillators fall out of step, the voltage-controlled oscillating circuit is controlled by an electronic or electromechanical search generator until its frequency is back within the normal synchronization range, or in that the voltage-controlled oscillating circuit is disconnected from its control signal $U_r$ and allowed to oscillate freely, in which case appropriate circuit arrangements lead to the generation of control oscillations which return the local oscillator into its synchronization range.

Control circuits known in the art can be classified into two groups, one group containing circuits with a narrow synchronization range, usually having short response times, whereas the other group contains circuits having a synchronization range which is widened when asynchronism occurs, but which have a sluggish response and require the provision of additional circuit components.

The narrow synchronization range of circuits of the first group is usually due to the use of a filter in which the incoming signal $U_e$ is compared with a reference built into the apparatus. This long response time of circuits of the second group is due to the introduction of additional electronic and/or electromechanical components which have usually large characteristic time constants.

It is the object of the present invention to synchronize the frequency of a local oscillator in phase with the frequency of a master oscillator in such a way that the response to control is quick and effective throughout a wide range of frequencies, i.e., over many octaves, and the frequency of the local oscillator is preferably a submultiple of the frequency of the master oscillator.

The arrangement proposed by the invention is characterised in that the control circuit comprises an outer and an inner loop, the outer loop containing a phase discriminator, a difference integrator, a voltage-controlled oscillating circuit and a frequency divider, whereas the inner loop comprises only the difference integrator, the voltage-controlled oscillating circuit and the frequency divider and these loops functionally cooperate in that the phase discriminator uses the original control signal $U_s$ of frequency $F_s$ and the divided frequency signal $U_t$ of frequency $F_t$ of the voltage-controlled oscillating circuit to form a signal $U_e$ containing the information relating to the phase difference between teh two signals, whereas the difference integrator uses the RC-averaged signal $U_e$ and the likewise RC-averaged signal $U_t$ from the inner loop to form the true integral of their difference, which in the form of a signal $U_r$ feeds the voltage dependant oscillating circuit which provides the signal $U_o$ of the frequency $F_o$ which simultaneously feeds the user and the frequency divider which applies the signal $U_o$ after division by the factor $n$ as a signal $U_t$ of the frequency $F_t$ to both the phase discriminator in the outer loop and the difference integrator in the inner loop.

Figure 2:
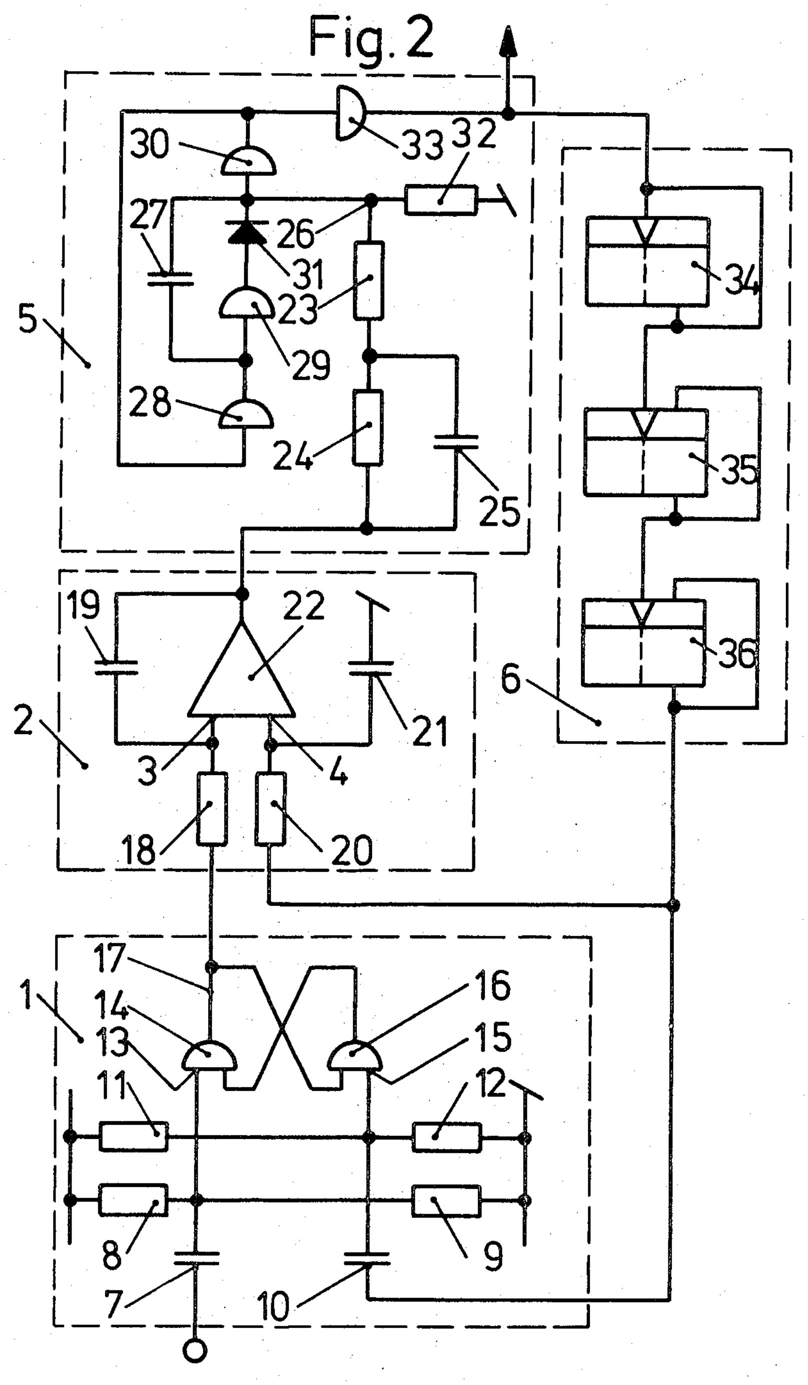
Figure 3A:
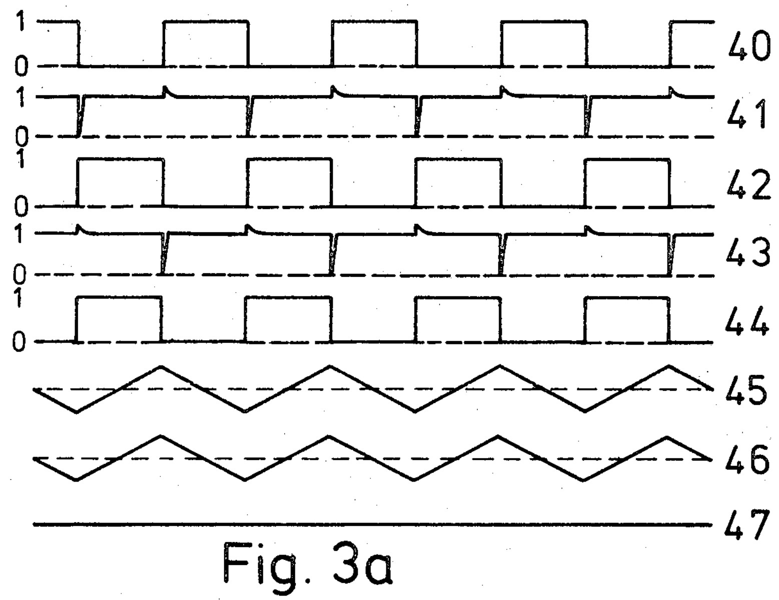
Figure 3B:
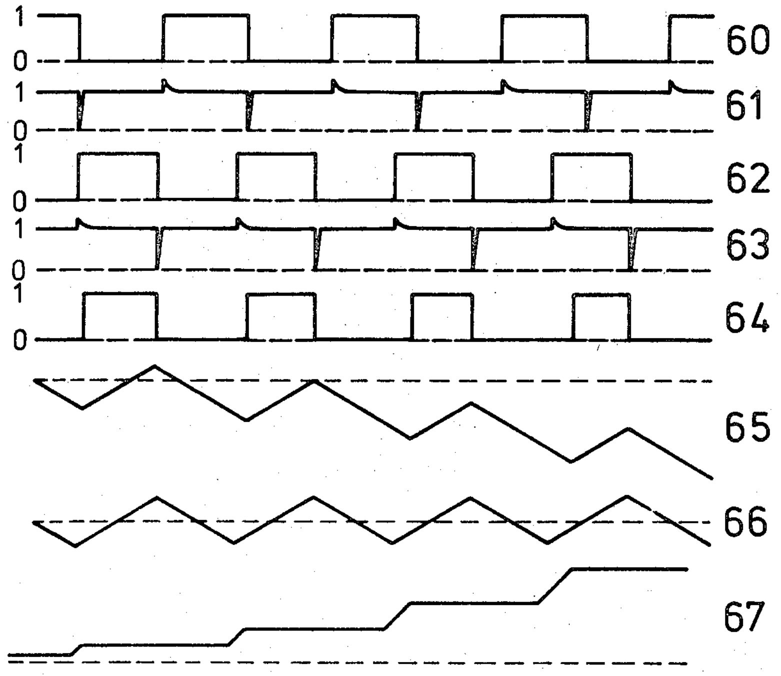

An embodiment of the invention is schematically shown in the accompanying drawing in which FIG. 1 is a block diagram of the proposed arrangement, FIG. 2 is the detailed circuitry of the arrangement, and FIGS. 3*a* and 3*b* illustrate a number of signal wave shapes.

The block diagram in FIG. 1 illustrates the signal flow between the several functional members of the control circuit. A phase discriminator 1 compares the frequency and phase of signals $U_s$ and $U_t$ having the frequencies $F_s$ and $F_t$ respectively and transmits the resultant difference signal $U_e$ to a difference integrator 2. This signal is applied to an inverting input 3, whereas the signal $U_t$ is also applied to a non-inverting input 4 of the integrator. Integration of the difference $U_t - U_e$ produces the control signal $U_r$ which feeds a voltage-dependent oscilating circuit 5. Its frequency $F_o$ which depends upon the voltage $U_r$ is divided in a frequency divider 6 by a factor *n* which is determined by the design and thus becomes the frequency $F_t$ of the signal $U_t$ which is applied to the phase discriminator 1 and the difference integrator 2.

The manner in which this arrangement functions will now be described in greater detail by reference to FIG. 2.

The signals $U_s$ of frequency $F_s$ and $U_t$ of frequency $F_t$ are both square wave pulse trains. They are each differentiated in an RC member which in one instance comprises a capacitor 7 and resistors 8, 9 and in the other a capacitor 10 and resistors 11, 12. The differentiated signal $U_s$ is applied to one input 13 of a NAND-gate 14 and the differentiated signal $U_t$ to one input 15 of a second NAND-gate 16. The inputs 13 and 15 are statically maintained at a potential corresponding to the logic state ONE. This potential is supplied by potential dividers formed by the resistors 8, 9 respectively 11, 12. Actual feedback between the NAND-gates 14, 16 creates a bistable switch which in its output alternately provides potentials corresponding to the logic states ONE and ZERO, in such manner that a change of state takes place only when a falling flank of the signal $U_s$ is followed by a falling flank of the signal $U_t$; if two falling flanks of the same signal are consecutive, that of the other failing to appear, then the logic state of the output 17 will not change. The signal $V_e$ which appears in the output 17 is therefore again a square wave pulse train which is averaged over the time constant of an RC member consisting of a resistor 18 and a capacitor 19. An RC member of identical value consisting of a resistor 20 and a capacitor 21 averages the signal $U_t$ which by virtue of the manner of its generation is a symmetrical square wave pulse train of a kind which in regular alternation represents the logic states ONE and ZERO. The RC-averaged signal $U_e$ feeds the inverting input 3 of an operational amplifier 22, whereas the RC-averaged signal $U_t$ feeds the non-inverting input 4. Owing to the feed-back provided by capacitor 19 the operational amplifier functions as a true integrator. Its output signal $U_r$ controls the voltage at a junction 26 through a resistor 24 shunted by a capacitor 25 and resistors 24 and 23, resistors 24, 23, 32 forming a potential divider. This voltage determines the discharging time of a capacitor 27 and hence the frequency $F_o$ of the voltage-controlled oscillating circuit 5. The latter consists of three inverters 28, 29, 30, a diode 31 and the capacitor 27. If the voltage in the output of the inverter 28 corresponds to logic ZERO, then the signal ONEwould appear in the output of the inverter 29 if the charging current of the capacitor 27 were not obtained from the inverter 29 through a high output impedance and the diode 31 in the forward direction. The input voltage of the inverter 30 therefore rises only slowly due to the time constant which substantially results from the capacity of capacitor 27 and the output impedance of the inverter 29. When the said input voltage of the inverter 30 reaches the threshold value, the inverter circuit 30 changes state and ZERO appears in its output, causing the output of inverter 28 to change to ONE. The capacitor 27 now functions as a coupling element and accelerates the change of state of inverter 30. In this potential state the diode 31 prevents the capacitor form discharging into the inverter 29. The state of the loop is stable until sufficient of the charge has leaked away through the resistor 32 to allow the input voltage of the inverter 30 to fall below its threshold value. When this situation has been reached the inverter 30 again changes state and the described cycle repeats itself.

Whereas the charging time of the capacitor 27 is substantially constant, its discharging time depends upon the potential at the point 26 which is identical with the input voltage of the inverter 30. For high values of $U_r$ the potential at 26 is likewise high and consequently the discharging time of the capacitor 27 is long and the frequency $F_o$ low. For smaller values of $U_r$ the frequency $F_o$ is thus high. The output signal of the inverter 30 is protected by an inverter 33 from reactive effects of following users (not all shown), and is transferred to the frequency divider 6 and the users (not shown) in the form of a signal $U_o$ of frequency $F_o$. In the frequency divider 6 which in this embodiment consists of three bistable flip-flops 34, 35, 36 connected in series, the frequency $F_o$ is divided by a fixed factor *n* determined by the apparatus. In the present instance the factor *n* is determined by the number of flip-flops, i.e., $n = 2^3 = 8$. The frequency $F_t$ is less than $F_o$ by a factor 8 and is fed to the phase discriminator 1 in the outer loop and the difference integrator 2 in the inner loop of the control circuit.

FIG. 3 illustrates a number of signal forms, FIG. *3a* relating to the synchronous state and FIG. *3b* to the asynchronous state of $U_s$ and $U_t$. The simplifying assumption has been made that $U_s/U_t$ = const., i.e. that the loop is open and that no control takes place.

In FIG. *3a* a signal 40, as an exemple of $U_s$, and a signal 42, as an example of $U_t$, are plotted over the same time axis. The signals 41 , 43 are the RC-differentiated signals $U_s$ 40 and $U_t$ 42. A change of state of signal $U_e$ which is represented as a wave form 44 takes place either when signal 41 or signal 43 have a peak descending from ONE to ZERO so that the state of signal 44 changes only when the peaks of the signals 41 and 43 occur in alternation. An analog signal 45 shows the voltage change at the inverting input 3 of the difference integrator 2, i.e., the RC-averaged signal $U_e$ 44. An analog signal is the RC-averaged signal 42 which feeds the non-inverting input 4 of the difference integrator 2. From the form of construction of the phase discriminator 1 it will be understood that in the case of synchronism, which is illustrated in FIG. *3a*, the signals $U_t$ 42 and $U_e$ 44 are synchronous and in cophase. Consequently the signals 45 and 46 are identical. The result of integration of the difference between the signals 45 and 46 is a constant represented by a signal 47. It is evident that in the case of synchronism the signals $U_t$ 42 or $U_e$ 44 cause no amplitude or frequency modulation of any kind of the voltage-controlled oscillating circuit 5.

FIG. *3b* shows the signals 60, 61, 62, 63, 64, 65, 66, 67 corresponding to the signals 40, 41, 42, 43, 44, 45, 46, 47 shown in FIG. *3a* for the synchronous state. In order to illustrate the manner in which the difference integrator 2 functions the simplifying assumption has been made that the ratio of $F_s/F_t$ = const. The displacement in level of signal 65 which represents the RC-averaged signal $U_e$ 64 is apparent. However, this displacement in level must be considered as being merely an "apparent" change, since it is compensated by capacitor 19 with the exception of a small remainder which is introduced by the signal $U_r$ that is divided by the gain factor of the operational amplifier. A signal 67 illustrates the voltage in the output of the difference integrator 2. If frequency and phase of the signals 60 and 62 differ, then this results in a displacement of the d.c. level in the output of the difference integrator 2 and hence also at the junction 26, so that the frequency $F_o$ of the voltage-controlled oscillating circuit 5 is changed in the contrary direction. For the sake of clarity this effect has been neglected in the present description.

I claim:

1. A device for controlling the frequency and phase of an oscillator, characterised in that the control circuit comprises an outer and an inner loop, the outer loop containing a phase discriminator, a difference integrator, a voltage-controlled oscillating circuit and a frequency divider, whereas the inner loop comprises only the difference integrator, the voltage-controleld oscillating circuit and the frequency divider and these loops functionally cooperate in that the phase discriminator uses the original control signal $U_s$ of frequency $F_s$ and the divided frequency signal $U_t$ of frequency $F_t$ of the voltage-controlled oscillating circuit to form a signal $U_e$ containing the information relating to the phase difference between the two signals, whereas the difference integrator uses the RC-averaged signal $U_e$ and the likewise RC-averaged signal $U_t$ from the inner loop to form the true integral of their difference, which in the form of a signal $U_r$ feeds the voltage-defendent oscillating circuit which provides the signal $U_o$ of the frequency $F_o$ which simultaneously feeds the user and the frequency divider which applies the signal $U_o$ after division by the factor $n$ as a signal $U_t$ of the frequency $F_t$ to both the phase discriminator in the outer loop and the difference integrator in the inner loop.

2. A device according to claim 1, characterised in that the phase discriminator consists of two NAND circuits of which one input each is maintained by a potential divider at a potential corresponding to logic state ONE, whereas the other input of each is conductively connected to the output of the other NAND circuit so that the signal sources of square wave pulses capacitively coupled to the two inputs associated with potential dividers will change the signal in the output of the phase discriminator which is identical with the output of one of the NAND circuits form one logic state to the other in step with consecutively descending flanks of their square wave pulses which are differentiated by the nature of the coupling, in such manner that a change of state occurs only when one descending flank in one input is followed by a descending flank in the other input.

3. A device according to claim 1, characterised in that the difference integrator consists of an operational amplifier having one inverting and one non-inverting input, both inputs being associated with RC members of identical value, so that the capacitor at the inverting input connects this to the output of the operational amplifier, whereas the non-inverting input is coupled by its capacitor to earth, the signals being applied to the inputs through the resistors.

* * * * *